Figure 1:
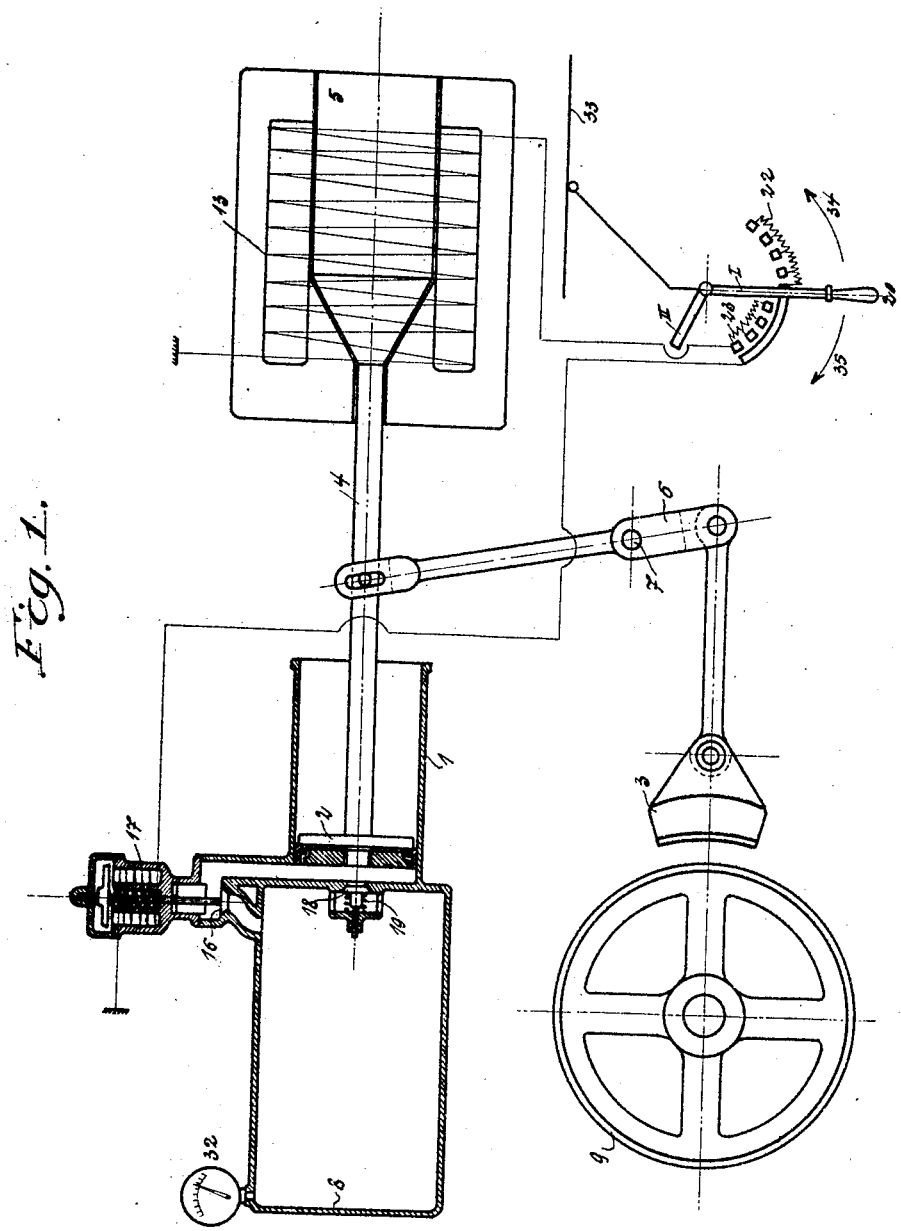

H. PIEPER.
AIR BRAKE
APPLICATION FILED JULY 18, 1916.

1,376,573.

Patented May 3, 1921.
9 SHEETS—SHEET 1.

H. PIEPER.
AIR BRAKE
APPLICATION FILED JULY 18, 1916.
1,376,573.
Patented May 3, 1921.
9 SHEETS—SHEET 9.
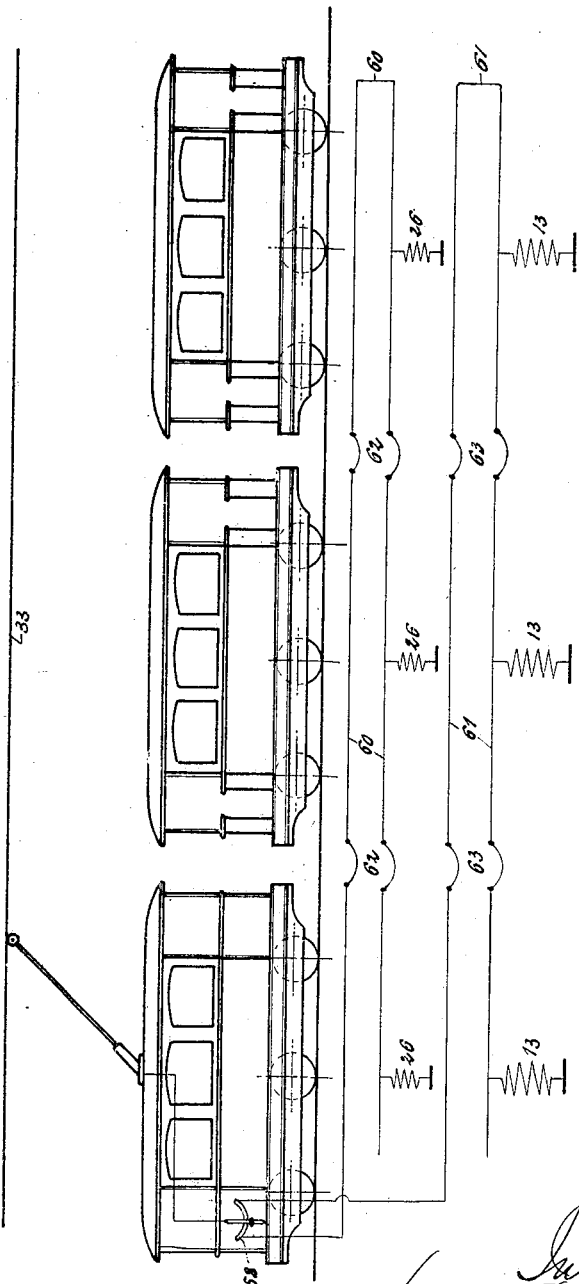
Fig. 9.
Inventor.
Henri Pieper,
by
Atty.

UNITED STATES PATENT OFFICE.

HENRI PIEPER, OF LIEGE, BELGIUM.

AIR-BRAKE.

1,376,573.

Specification of Letters Patent.  Patented May 3, 1921.

Application filed July 18, 1916. Serial No. 109,933.

*To all whom it may concern:*

Be it known that I, HENRI PIEPER, a citizen of the Kingdom of Belgium, residing at Liege, in Belgium, have invented certain new and useful Improvements in Air-Brakes, of which the following is a specification.

As is well known air pressure brakes and vacuum brakes possess the disadvantage that the brakes can be operated only in a restricted number of repetitions owing to the fact that the brake cylinder is charged from a reservoir of a limited pressure capacity. On the other hand, when a compressor or a pump is employed in order to permit the realization of an indefinite number of operations, the whole system becomes expensive and complicated. Another objection is that such brakes work automatically in emergency only when applied to a train of two or more cars, in which case the interruption of the coupling device connecting the pipes from car to car causes the automatic working, while when applied to a single car they can operate automatically only by means of special auxiliary devices complicating the working. Finally the usual air brake systems comprise a very large number of valves and pipes so that there are many possibilities of pressure losses which require on the other hand an exact and permanent supervision.

According to my invention these drawbacks are avoided in that the reservoir containing compressed air or vacuum is maintained for the reason that the air brakes charged therefrom are constructed as compressors or pumps respectively which reëstablish after each braking the original pressure state of the reservoir under the action of a power released at the same time as the brakes. This idea is realized according to my invention in such a way that the brakes are enabled to be controlled in a rapid and simple manner and to work automatically also in the case of an interruption of the line current. For these purposes according to my invention an electro-magnet capable of being varied in its strength is provided for producing the compressing or pumping action, these electric regulating means being applied when required also to the valve device controlling the communication between the reservoir and the brake cylinder.

Advantageously the valve device controlled electrically is constructed according to my invention so that in the case of an automatic working of the brake, the braking action takes place without jerk. Furthermore my invention comprises a special construction of the brake piston controlled electrically permitting the automatic compensation of the inavoidable losses of pressure. Finally my invention concerns several electric connections serving for regulating the magnets controlling the brake piston and the valves.

Figure 2:
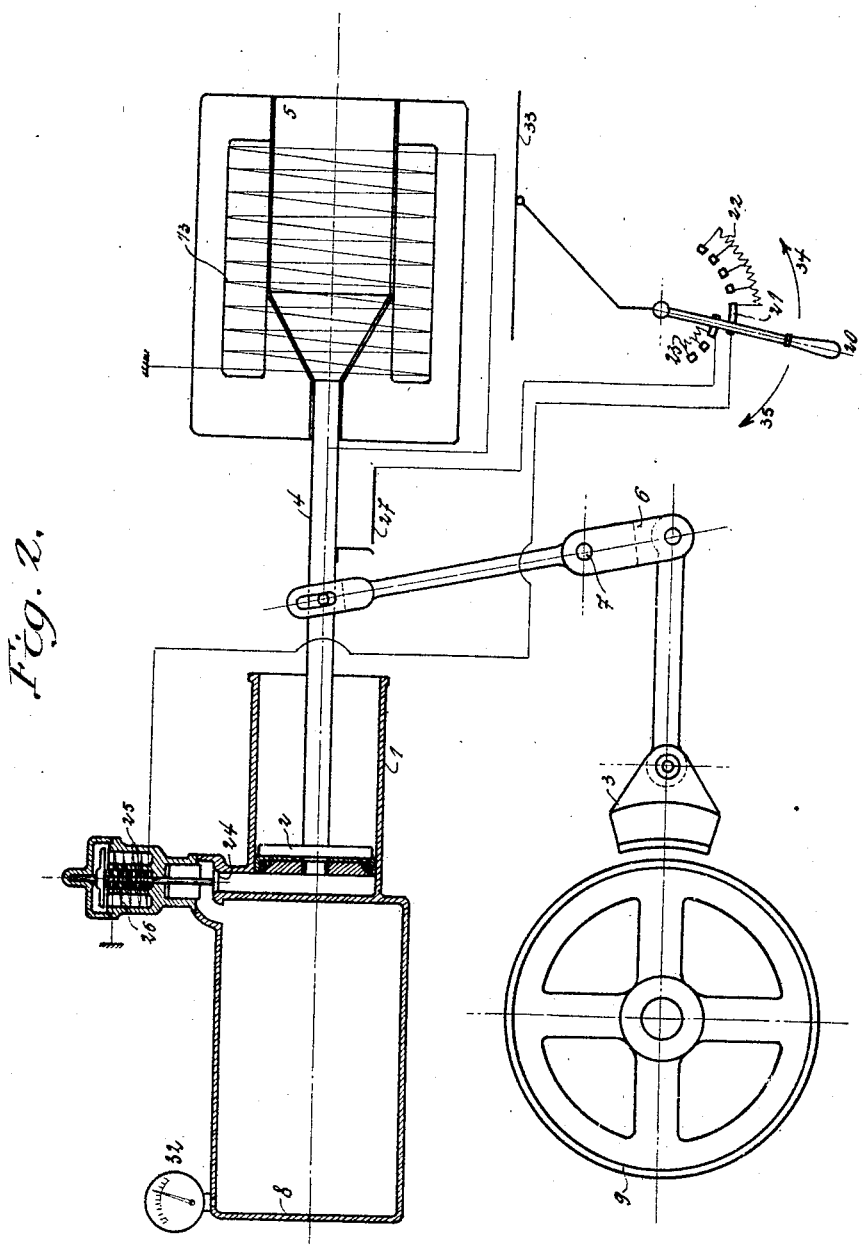
Figure 3:
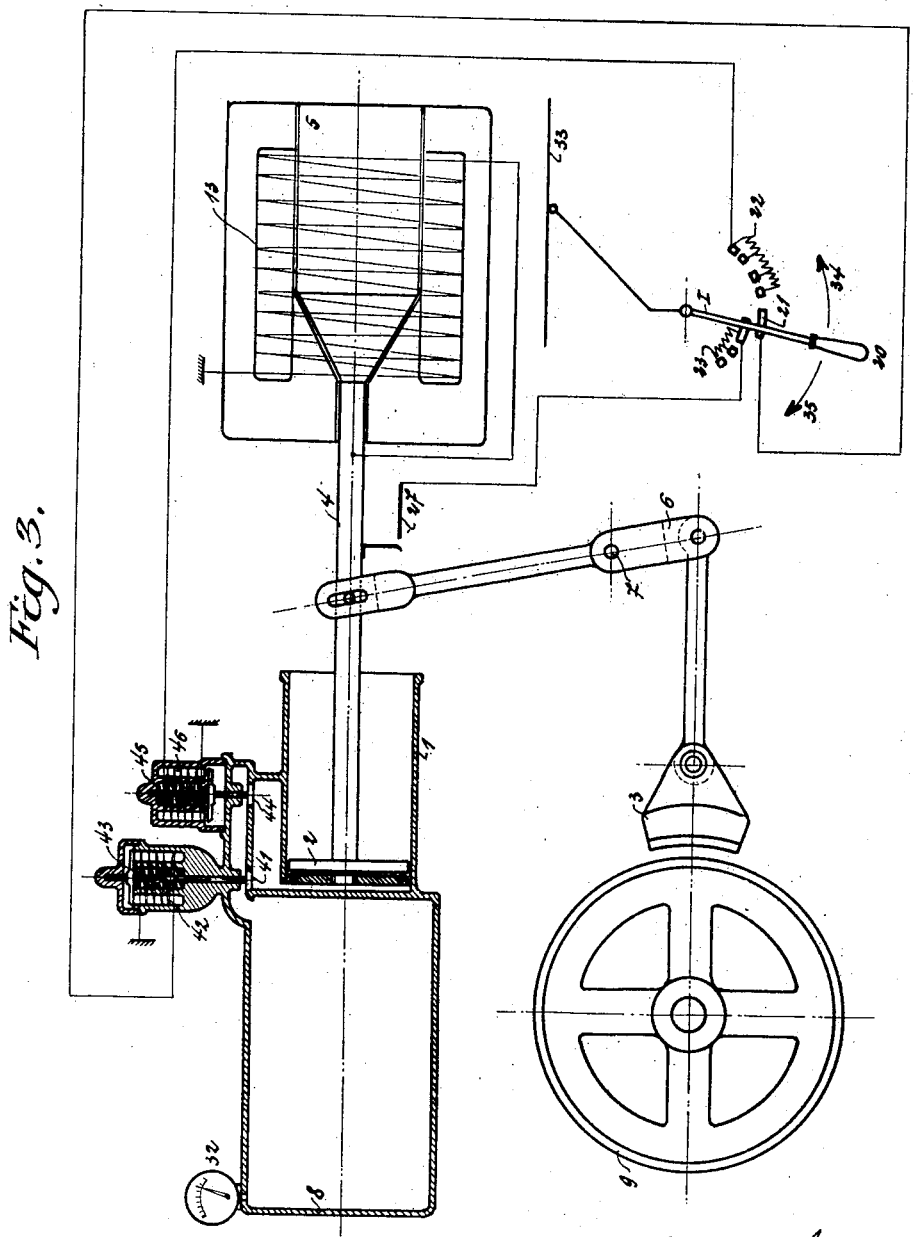
Figure 5:
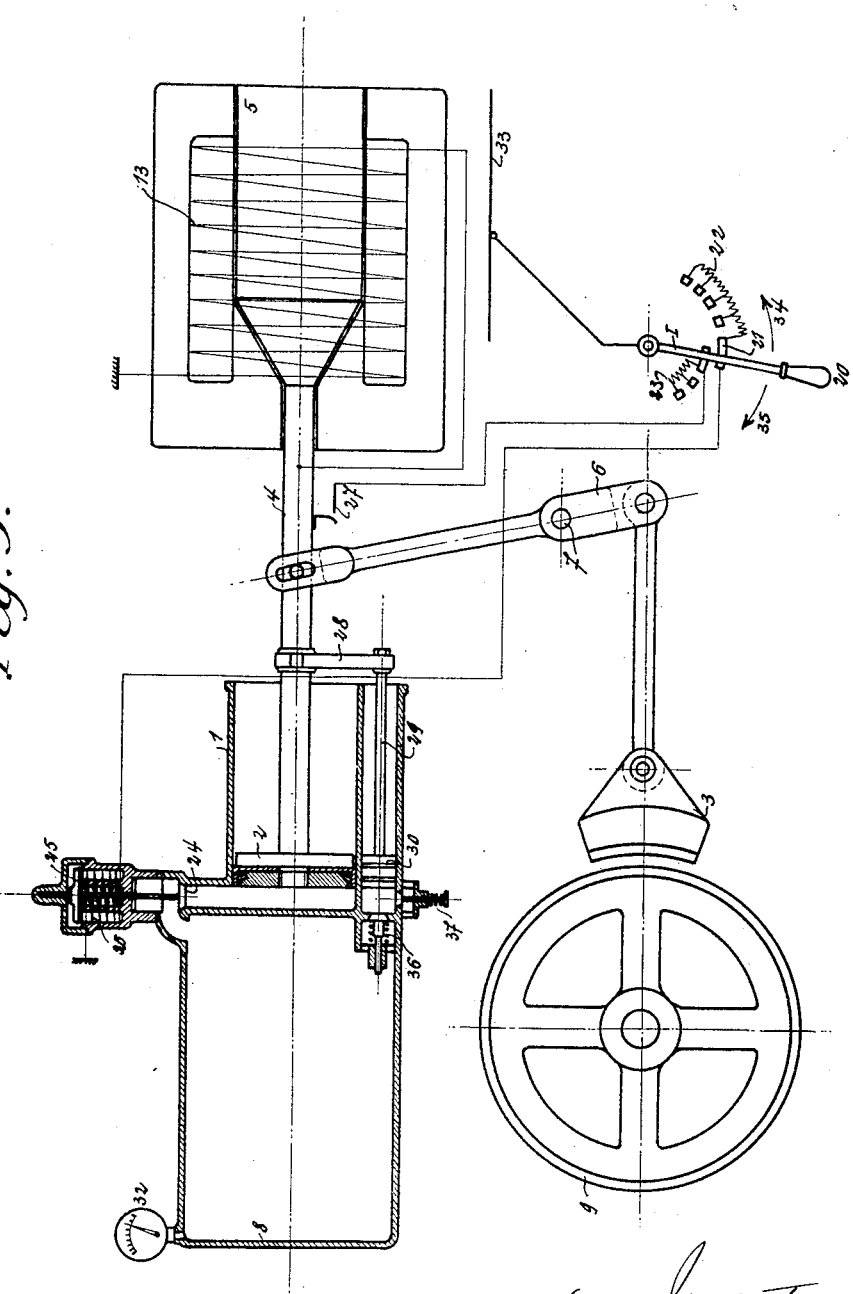
Figure 6:
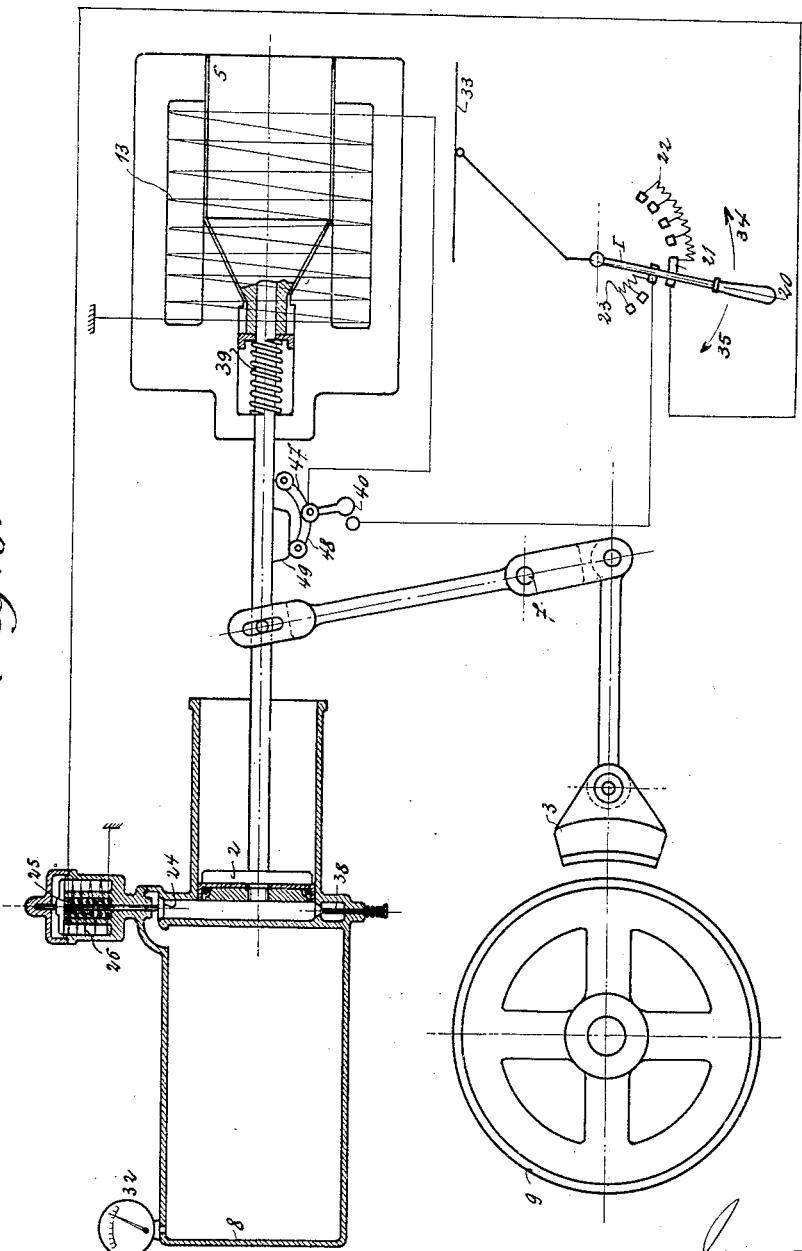
Figure 7:
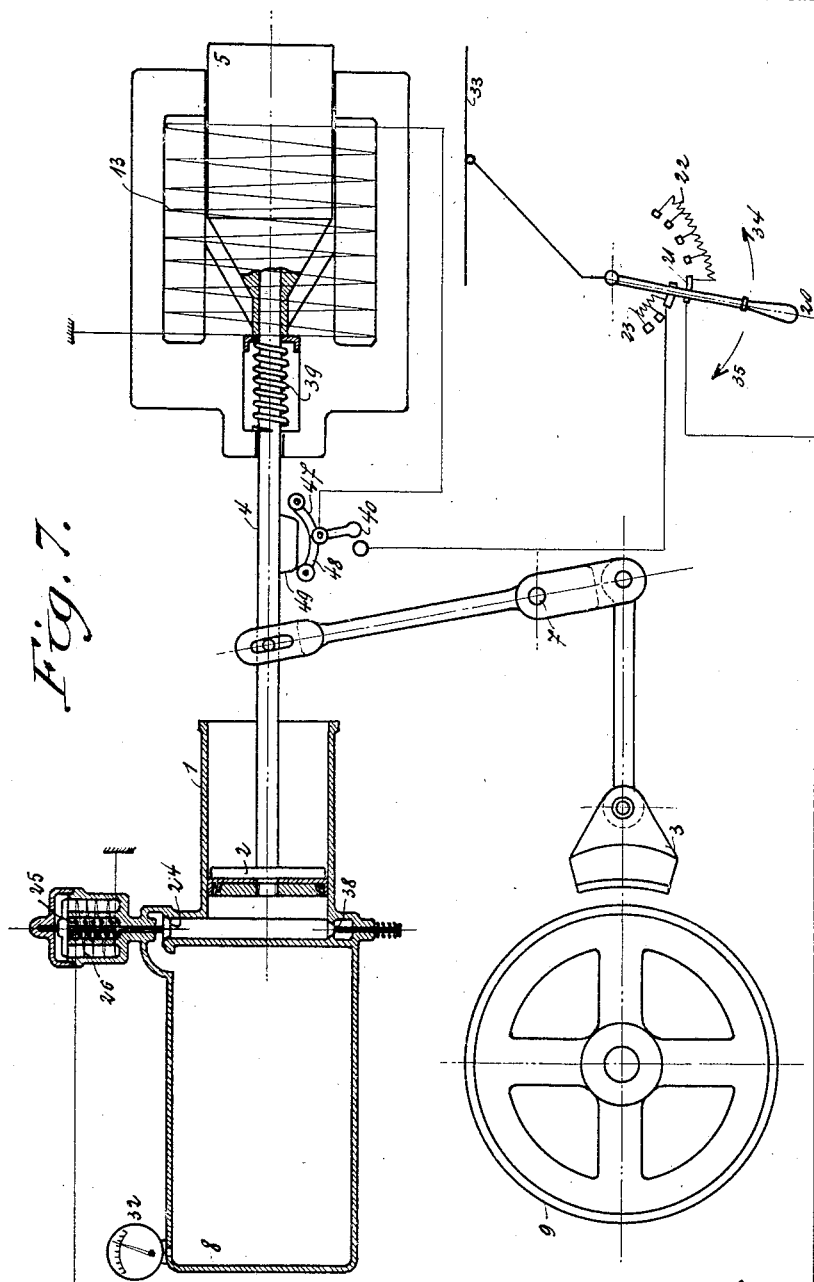
Figure 8:
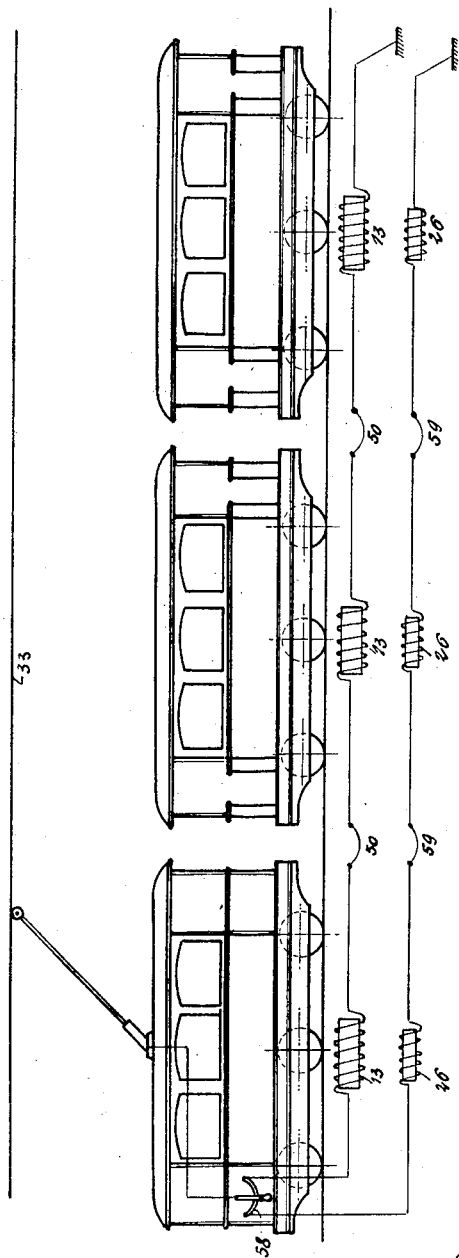

In the accompanying drawings Figure 1 shows diagrammatically a brake system according to my invention using two valves for connecting the reservoir and brake cylinder. Fig. 2 represents another embodiment of my invention using only one valve for connecting the brake cylinder and reservoir. In Fig. 3 two electrically controlled valves of different sizes are inserted between the reservoir and cylinder, while according to Fig. 4 a single valve controlled by two magnets is provided for putting in communication reservoir and brake cylinder. Fig. 5 shows a modified construction of the brake piston permitting compensating for the pressure losses arising in the brake cylinder. The Figs. 6 and 7 represent two other special constructions of the brake piston serving for the same purpose. Figs. 8 and 9 show diagramtically two electric connections to be applied in the case of a train having brakes according to my invention on each car.

In Fig. 1 the brake cylinder 1 contains the piston 2 which is connected to the iron core 5 of the solenoid 13 by means of the rod 4 and acts upon the brake shoe 3 and the wheel 9 by means of the intermediary lever 6 having its bearing at 7. The brake cylinder 1 communicates with the reservoir 8 filled with compressed air through two valves 16 and 18. The one 18 of these valves is an automatic valve pressed on its seat by the spring 19 and controlling the air entering the reservoir 8, while the other valve 16 controls the admission of the air to the brake cylinder 1 and is controlled by an electro-magnet 17 holding it closed when energized but opening it when deënergized. The pressure gage 32, which is advantageously situated in the motorman's cab, indicates the pressure existing in the reservoir 8.

The regulating of the magnets 13 and 17 is effected by means of a controller 20 to the handle of which two contacts 1 and 11 are attached. The contacts 1 and 11 are connected to the circuit line 33 and can be moved by means of the handle over the contact drum 21 connected with the magnet 17 and the resistances 22, and over the resistances 23 connected with the magnet 13. The other ends of the windings of 13 and 17 are connected to the earth.

The arrangement shown in Fig. 1 works in the following manner: Normally the circuit of the magnet 17 is closed by the contact 1 occupying the position illustrated by Fig. 1 and consequently, the valve 16 is closed. The circuit of the solenoid 13 is open at the same time. Now, when the handle is moved rapidly in the direction of the arrow 34 until the contact 1 has attained the end of the resistances 22, all these resistances are put in the circuit of the magnet 17 which releases consequently the valve 16 which is then opened by the pressure of the air coming from the reservoir 8. At the same time the contact 11 shifted to a certain degree with the contact 1 arrives at the commencement of the resistances 23, whereby the magnet 13 receives full current so as to hold the core 5 drawn in which, on the other hand, prevents any movement of the piston 2 against the action of the air pressure.

On the further movement of the handle 20 in the sense of the arrow 34 the contact 11 puts the resistances 23 in the circuit of the solenoid 13, the field of which is thereby reduced so that the piston 2 is moved by the air pressure and applies the brake to the wheel, the braking action increasing in conformity to the progressive reduction of the magnetic field opposing its strength to the air pressure. The braking action attains its maximum value after having completely inserted the resistances 23 in the circuit of the magnet 13.

In order to release the brake the handle 20 must be turned in the sense of the arrow 35 again in the original position. During this movement, firstly, the resistances 23 are put out progressively so that the magnet 13 increasingly energized releases the brake 3 and presses the air from the brake cylinder 1 into the reservoir through the automatic valve 18. On continuing to turn rapidly the handle 20 in the sense of the arrow 35 until the original position is attained, the resistances 22 are put out and the electromagnet 17 is reënergized so that the valve 16 is closed immediately after having reëstablished the original pressure in the reservoir. The brake system is then again ready to the next operation.

The brake shown in Fig. 1 can be controlled by means of the handle 20 also in such a way that the braking action is regulated by the valve 16. In this case the handle 20 must be moved slowly in the sense of the arrow 34 over the resistances 22, whereby, on the one hand the circuit of the solenoid 13 is interrupted and, on the other hand, the current exciting the magnet 17 is progressively reduced by the contact 1 passing over the resistances 22. Consequently the valve 16 is opened more and more by the action of the air coming from the reservoir so that the brake action increases correspondingly. When the handle 20 is returned in the direction of the arrow 35 in order to release the brake, firstly the valve 16 is closed again by the magnet 17, then the contact 1 closes the circuit of the magnet 13 after having passed the position shown in Fig. 1, the current of the magnet 13 being augmented to the maximum value during the further movement of the contact 1 by putting out progressively the resistances 23. Consequently the magnet 13 releases the brake and, at the same time, moves the piston 2 working as a compressor again into the original position. Now, also the handle 20 can be returned.

According to Fig. 2 only a single valve 24 is provided for connecting the brake cylinder 1 and the reservoir 8, this valve 24 being opened by a spring 25 against the pressure of the air when a magnet 26 holding normally closed the valve 24 is deënergized. The controller 20 comprises, besides the resistances 22, 23 and the contact drum 21, a single movable contact, the resistances 23 being connected with the magnet 13 through a contact 27 which is opened by the rod 4 when the piston 2 occupies its original position.

The brake shown in Fig. 2 can be controlled in a double way by varying the braking action by regulating the excitation either of the magnet 13 or of the magnet 26. When the handle 20 is slowly turned in the sense of the arrow 34, the resistances 22 are progressively put in the circuit of the magnet 26, the circuit of the magnet 13 being interrupted at the same time. The valve 24 upon which the magnet 26 and the spring 25 act in opposite sense regulates the braking action by augmenting progressively the section of the air passage. If it is desired to control the braking action by means of the magnet 13, the handle 20 is moved in the sense of the arrow 35 over the resistances 23. During this movement of the handle 20, firstly, the magnet 26 is completely put out so that the valve 24 can be opened by the spring 25. The piston 2 shifted a little way by the compressed air establishes immediately afterward the circuit of the magnet 13 by closing the contact 27 so that the piston 2 is maintained in this position by the magnet 13 energized and is released for producing the braking action only after having reduced the field of the magnet 13 by means of the resistances 23.

In order to release the brake the handle is to be returned in the sense of the arrow 34, whereby firstly the magnet 13 producing the releasing and compressing action is reënergized to the maximum value of excitation, then the magnet 26 closing the valve 24 is put again in the circuit and finally the circuit of the magnet 13 is interrupted automatically by the piston 2 attaining its original position and opening the contact 27. When the valve 24 is used for varying the braking action, firstly, the handle 20 must be moved into the other final position according to the direction of the arrow 35 so as to open the circuit of the magnet 26 and to energize the magnet 13 at the minimum excitation value. Then on returning the handle 20 toward its original position, the releasing of the brake, the compression of the air and the closing of the valve take place. The circuit of the magnet 13 is interrupted automatically at the end of the compression stroke by the re-opening of the contact 27. The contact 27 realizes the further advantage in that the closing of this contact when taking place at a moment when the controller 20 is in the normal position causes immediately a compressing action of the piston 2 compensating the losses of the reservoir.

According to Fig. 3 there is arranged between the reservoir 8 and the brake cylinder, besides a valve 44 being opened by a magnet 46 and closed by a spring 45, still another valve 41 which is maintained closed by a magnet 42 when energized against the action of a spring 43. This valve 41 has an air passage of a relatively small section so that the compressed air is prevented from entering rapidly the brake cylinder and consequently produces the braking without any jerk. On the contrary the valve 44 has an air passage of a comparatively large section so as to permit a rapid braking. The other equipment of the brake system shown in Fig. 3 is similar to that indicated in Fig. 2, the magnet 42 being connected to the contact drum 21, while the resistances 22 and the magnet 46 are separated therefrom.

If in the brake system according to Fig. 3 the current in the line 33 is interrupted by any reason, also the current of the magnet 42 is interrupted so that the valve 41 is opened by the spring 43. The valve 44 being closed at the same time, the brake cylinder 1 receives air from the reservoir 8 only through the small section of the valve 41 so that the automatic working of the brake takes place without jerk and gradually.

If the motorman wishes to operate the brake he turns the handle in the sense of the arrow 34 so as to cut off the current of the magnet 42. The valve 41 will be opened and the braking action commences at reduced speed and strength. In order to accelerate the braking action when desired, the motorman continues to move the handle 20 in the sense of the arrow 34, thus exciting more and more the magnet 46 by putting out gradually the resistances 22. Consequently, the valve 44 will be opened in a corresponding degree so as to allow a rapid admission of the air coming from the reservoir 8. In the case of braking by means of the controller 20, evidently it is not absolutely necessary to open the valve of small section 41. For releasing the brake the handle 20 must be moved firstly into the final position indicated by the arrow 35 and then to its middle position. During this movement of the controller the magnet 13 is brought up to full excitation by putting out gradually the resistances 23. The circuit of the magnet 13 will be opened automatically by the piston 2 separating the contacts 27 at the end of the compression stroke. At the same time the two valves 41 and 44 are re-closed.

Figure 4:
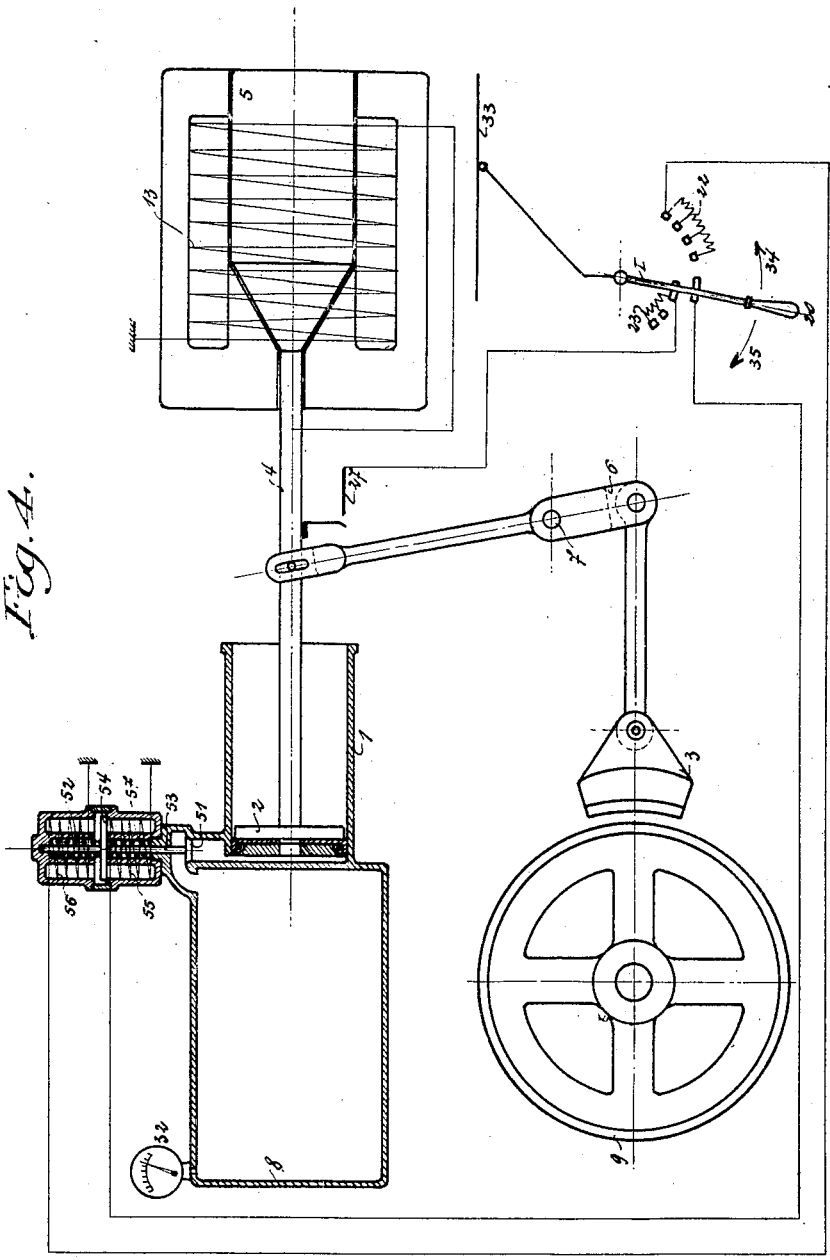

In the arrangement shown in Fig. 4 a single valve 51 is inserted between the reservoir 8 and the brake cylinder 1. This valve 51 is held closed by the pressure of the air or by a spring 52, while a second spring 57 tends to lift it a little way for instance 1 mm. Further the two magnets 55 and 56 act upon the valve 51 by means of a common iron core 54 attached to the valve rod 53. When the magnets 55, 56 are deënergized, the spring 57 opens the valve 51 against the action of the spring 52 to the said small extent, while the magnet 55 when excited is enabled to reclose the valve against the strength of the spring 57. On the contrary if the magnet 55 is deënergized and the magnet 56 receives current the latter attracts the armature 54 so as to open the valve to the maximum section.

The brake according to Fig. 4 occupying its normal position, the line current passes only through the magnet 55 which holds closed the valve 51. In order to brake, firstly, this exciting current is interrupted by turning the controller handle 20 in the sense of the arrow 34. Thus the spring 57 is enabled to lift the valve 51 the said short stroke against the action of the spring 52 so as to provoke a gradual braking. When, on the further movement of the handle 20, the magnet 56 is excited by a current passing through the resistances 22, it lifts the valve 51 against the action of the spring 52 to an extent corresponding to its excitation and accelerates the braking action by augmenting the section of the air passage. For releasing the brake the handle 20 must be firstly moved into the final position indicated by the arrow 35 and then returned to the original position. During this movement of the handle 20 the valve 51 is maintained open by the spring 57 and the pressure of the air flowing to the reservoir 8 until the handle attaining its original position recloses the current of the magnet 55 which closes then the valve 51.

The automatic working of the brake is produced in the case of an interruption of the line current in that the magnet 55 becomes deënergized so as to release the valve 51 which is then lifted by the spring 57 producing the said small stroke. Thus, an air passage of small section is created which permits a braking only of a reduced speed. The magnet 56 remaining deënergized in this case the valve 51 cannot be opened to a larger extent so that a too rapid automatic braking action is impossible, the brakes being applied to the wheels without jerk in the same gradual manner as operated by hand.

According to Fig. 5 a small auxiliary piston 30 is attached to the brake piston 2 by means of the rods 28, 29, the auxiliary piston 30 drawing in atmospheric air through the valve 37 and pressing this air through the valve 36 into the reservoir 8 in the case of an inadmissible reduction of the pressure existing in the reservoir. The working of the pump 30 may be rendered dependent on the pressure existing in the reservoir 8 by varying correspondingly the clearance space of the pump or the strength of the spring of the valve 36 or by acting upon the suction valve 37 by means of the pressure in the reservoir. If desired the auxiliary pump may be driven by electromotive power separately from the brake piston.

According to the Figs. 6 and 7 the brake cylinder itself can be used as an auxiliary pump serving to compensate the pressure losses arising in the brake system. For this purpose the stroke of the piston 2 is elongated a certain portion for instance 20 mm. and a clearance space of a fixed value is provided between the piston 2 occupying its inner deadpoint and the valve 24 connecting the reservoir 8 and the cylinder 1. The valve 24 is controlled by the magnet 26 closing it when energized. At the end of the cylinder 1 there is a suction valve 38, which begins working upon an abnormal reduction of pressure. The iron core 5 of the magnet 13 acts upon a spring 39 so as to compress it completely at the end of the compression stroke of the piston 2 as shown in Fig. 6.

According to Figs. 6 and 7 the piston 2 is shifted, at the end of its compression stroke by the spring 39 a certain distance corresponding to the stroke of the spring 39, for instance, 20 mm. as shown in Fig. 7, without effecting a braking action. The clearance space of the cylinder 1 is chosen so that the volume of air compressed during the releasing stroke is reexpanded to atmospheric pressure if the pressure attained during the previous compression is equal to the necessary pressure value, for instance, 4 kg. But if this value is not attained on acount of losses of air, a vacuum exists in the cylinder 1 at the end of the increasing of the volume produced by the spring 39. Consequently the suction valve 38 is opened and a corresponding quantity of atmospheric air enters so that the cylinder 1 and reservoir 8 contain again the volume of air required for attaining the necessary pressure, for instance, of 4 kg. during the next compression stroke of the piston 2. Instead of a spring a magnet or any other suitable device may be employed for enabling the piston 2 to produce a suction action.

Between the magnet 13 and the resistances 23 is inserted an automatic switch 40 which is controlled by a nose 49 of the piston rod 4 engaging with two arms 47, 48 attached to the switch. The switch 40 is opened at the end of the compression stroke— see Fig. 6—and remains opened—see Fig. 7—during the piston stroke caused by the spring 39, but is closed and remains closed during the rest of the stroke. In this way the automatic interruption of the circuit of the magnet 13 is maintained also during the portion of the piston stroke caused by the spring 39 so as to avoid unnecessary loss of electric current. The other equipment of the arrangement shown in Figs. 6 and 7 is the same as that represented in Fig. 2. Also the controlling of the brake is the same in both the cases.

The Figs. 8 and 9 show an electric train having a plurality of cars each equipped with a brake according to my invention. In Fig. 8 which represents a train of three cars all the magnets 13 controlling the different brake pistons are connected in series with the controller 58 situated on the head car by means of the lines 50 passing from car to car. The controller is connected to the trolley wire 33 and the free end of the last magnet 13 is grounded through the rail. In the same manner the magnets 26 controlling the different valves are put in series by means of the lines 59 and the controller 58 between the earth and the trolley wire 33. If one of the cables including the lines 50 and 59 is interrupted for any reason, the magnets 26 become deënergized, the valves connecting reservoirs and brake cylinders are opened and all the brakes of the whole train enter automatically in action.

According to Fig. 9 the magnets 13 and the magnets 26 are connected in parallel to the trolley wire. In this case one of the series of ends of the magnets 13 and 26 are grounded, while the other series of ends are connected to the line 60 and 61 respectively coming from the controller 58 on the first of the three cars. The cables passing from car to car comprise two pairs of lines 62 and 63. When one of these cables is interrupted, all the magnets 26 become deënergized and consequently all the brakes of the train are automatically applied to the wheels.

Instead of magnets controlling the valves mechanical or pneumatic controlling means may be employed. Furthermore, the magnets controlling the brake piston may be replaced by an electric motor or any other suitable electric driver.

Having now described and ascertained the nature of my said invention, I declare what I claim to secure by Letters Patent is:

1. In an air controlling means for brakes, a compression chamber, a brake cylinder, means of communication between the compression chamber and the brake cylinder, a valve for regulating the flow of air from the compression chamber to the brake cylinder, electrical means for controlling said valve, a piston slidable within the brake cylinder adapted to travel away from said compression chamber as the air is admitted to the cylinder, a brake shoe, means for transmitting said motion to said brake shoe, electrical means for returning the piston to its normal position to release the brake shoe, means for controlling the brake releasing means, and means for maintaining pressure in the compression chamber.

2. In an air controlling means for brakes, a compression reservoir, a brake cylinder, means of communication between the compression reservoir and the brake cylinder, a piston slidable in the cylinder, a brake shoe, means for connecting the piston to said brake shoe, means comprising an electrically operated valve for effecting the connection between the reservoir and the brake cylinder during the braking stroke of the piston, an automatic valve for effecting a connection between the reservoir and brake cylinder during the compression or releasing stroke of the piston, and means for controlling the electrically operated valve.

3. In an air controlling means for brakes, a compression reservoir, a brake cylinder, means of communication between the reservoir and the brake cylinder, a piston slidable within the brake cylinder, a brake shoe, means for connecting the piston and said brake shoe, electrical means carried by the piston adapted to control the braking and releasing stroke thereof, an electrically operated valve adapted to regulate the flow of air from the reservoir to the brake cylinder, means for controlling the valve and piston by augmenting or decreasing the fields of the electrical operating means.

4. In an air controlling means for brakes, a compression reservoir, a brake cylinder, a piston slidable in said brake cylinder, a brake shoe, means for connecting piston and shoe, electrical means for returning the piston to its normal position to release the brake shoe means for controlling the brake releasing means valves in parallel inserted between said reservoir and brake cylinder, one of said valves having an air passage of small section, an electrical means for controlling said valves, the other valve having a large air passage, a hand controller, a magnet connected to the hand controller and acting upon the valves, whereby as the controller is moved the valves are operated and means for slowly applying the brake when the current passing through the electrical operating means of the first valve is interrupted.

5. In an air controlling means for brakes, a compression reservoir, a brake cylinder, a piston slidable in said cylinder, a brake shoe, means for connecting said piston and said brake shoe, means of communication between the reservoir and the brake cylinder, a valve for regulating the flow of air from the compression chamber to the brake cylinder, means for closing the valve, consisting of a magnet adapted to be deënergized by the interruption of the current passing therethrough, a spring in the said valve adapted to open the valve to a slight degree when the magnet is deënergized, a second magnet adapted to open the valve to full extent when excited after the field of the first magnet has been reduced.

6. In an air controlling means for brakes, a compression reservoir, a brake cylinder, a piston slidable in the brake cylinder, a brake shoe, means for connecting piston and brake shoe, a pump connected to said piston, means for operating said pump and piston whereby air is forced into the reservoir in dependence on the pressure already existing in the reservoir, said action bringing about a compensation for the air losses arising in the brake cylinder, electrical means for returning said piston to its normal position to release the brake shoe, means of communication between the reservoir and the brake cylinder and electrical means for controlling said means of communication and said releasing means.

7. In an air controlling means for brakes, a compression reservoir, a brake cylinder, means of communication between the reservoir and the brake cylinder, a piston slidable therein, an automatic valve provided at the clearance of the brake cylinder, means for drawing air through said automatic valve into the clearance of the brake cylinder and means for operating said piston whereby air is forced into said reservoir.

8. In an air controlling device for brakes, a compression reservoir, a brake cylinder, means of communication between the reservoir and the brake cylinder, a piston slidable therein, a magnet adapted to return the piston to its normal position to release the brake, means carried by the piston for closing the circuit of the piston magnet and a spring operating said piston so as to hold the piston magnet in a deënergized position and means for controlling said piston magnet.

In testimony whereof I affix my signature in presence of two witnesses.

HENRI PIEPER.

Witnesses:
EMILE HEPTIA,
EDOUARD CAJOT.